US008736855B2

(12) United States Patent
Mikura

(10) Patent No.: US 8,736,855 B2

(45) Date of Patent: May 27, 2014

(54) PRINT CONTROL APPARATUS AND METHOD TO DRY PRINTING AGENTS APPLIED TO PRINTING MEDIUMS

(75) Inventor: Susumu Mikura, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 12/891,676

(22) Filed: Sep. 27, 2010

(65) Prior Publication Data

US 2011/0075212 A1 Mar. 31, 2011

(30) Foreign Application Priority Data

Sep. 29, 2009 (JP) ................................ 2009-224835

(51) Int. Cl.
*G06F 3/12* (2006.01)
*B41J 2/01* (2006.01)

(52) U.S. Cl.
USPC ........ 358/1.13; 358/1.15; 358/1.18; 358/504; 347/102; 347/14; 347/19

(58) Field of Classification Search
CPC ..... B41J 2/2132; G06F 3/1229; G06F 3/1208
See application file for complete search history.

(56) References Cited

U.S. PATENT DOCUMENTS

| | | | | |
|---|---|---|---|---|
| 5,399,039 | A * | 3/1995 | Giles et al. | 400/636 |
| 6,149,327 | A * | 11/2000 | Ward et al. | 400/582 |
| 6,877,247 | B1 * | 4/2005 | DeMoore | 34/269 |
| 2003/0067504 | A1 * | 4/2003 | Spurr et al. | 347/19 |
| 2006/0132582 | A1 * | 6/2006 | Huang | 347/188 |
| 2008/0240749 | A1 * | 10/2008 | Horade | 399/43 |
| 2009/0244160 | A1 * | 10/2009 | Nakagaki | 347/16 |
| 2010/0192792 | A1 * | 8/2010 | Hall et al. | 101/424.1 |
| 2012/0182564 | A1 * | 7/2012 | Shibaoka | 358/1.9 |

FOREIGN PATENT DOCUMENTS

| | | | |
|---|---|---|---|
| JP | 2000-071574 | A | 3/2000 |
| JP | 2004-050661 | A | 2/2004 |
| JP | 2006-103849 | A | 4/2006 |
| JP | 2007-296702 | A | 11/2007 |

* cited by examiner

*Primary Examiner* — Dennis Dicker

(74) *Attorney, Agent, or Firm* — Canon USA, Inc., IP Division

(57) ABSTRACT

A print control apparatus includes a receiving unit configured to receive a print job, an allocation unit configured to allocate, based on the print job received by the receiving unit, a printing process in which an image based on the received print job is printed on a printing medium by applying a printing agent thereto, and a drying process in which the printing agent applied to the printing medium is dried, and a change unit configured to change, based on a user's instruction, the drying process allocated by the allocation unit.

24 Claims, 6 Drawing Sheets

FIG.4

| JOB ID | USER ID | TIME REQUIRED TO PRINT (MINUTES) | PRINT START TIME | INK DRYING TIME | INK DRYING START TIME | PAPER DISCHARGE START TIME |
|---|---|---|---|---|---|---|
| 1 | 10004 | 5 | DURING PRINT | 1 | 2008/7/1 15:09 | 2008/7/1 15:10 |
| 2 | 10009 | 3 | 2008/7/1 15:11 | 0 | – | 2008/7/1 15:14 |
| 3 | 10021 | 10 | 2008/7/1 15:15 | 3 | 2008/7/1 15:25 | 2008/7/1 15:28 |
| 4 | 10005 | 8 | 2008/7/1 15:29 | 5 | 2008/7/1 15:37 | 2008/7/1 15:42 |
| 5 | 10012 | 15 | 2008/7/1 15:43 | 10 | 2008/7/1 15:58 | 2008/7/1 16:08 |
| 6 | | | | | | |

PRINT CONTROL APPARATUS AND METHOD TO DRY PRINTING AGENTS APPLIED TO PRINTING MEDIUMS

BACKGROUND OF THE INVENTION

1. Field of the Invention

The present invention relates to a print control apparatus and method capable of controlling a print job including a process of drying a printing agent applied onto a printing medium.

2. Description of the Related Art

Hitherto, apparatuses such as an inkjet printer have been known, which dry a printing agent such as ink applied onto a printing medium such as paper to prevent another printing medium from being stained with the printing agent (see Japanese Patent Application Laid-Open No. 2000-71574). When a printing agent is dried in such a printer, a printing medium is not discharged while the printing agent is dried after the printing agent is applied onto the printing medium. Accordingly, while the printer performs a process of drying the printing medium, the printer cannot start printing of the subsequent print job.

However, when a user takes out a printed printing medium therefrom, the printing agent applied onto the printed printing medium does not stain another printing medium with the printing agent. Thus, execution of the process of drying can be omitted or shortened. In addition, the printing of the subsequent print job can quickly be started. However, a conventional drying process set in a printer can be neither canceled nor changed. Accordingly, a start of the subsequent print job is delayed.

SUMMARY OF THE INVENTION

The present invention is directed to a print control apparatus and method capable of cancelling a drying process allocated based on a received print job. In addition, the present invention relates to a print control apparatus and method capable of changing a drying process allocated based on a received print job.

According to an aspect of the present invention, a print control apparatus includes a receiving unit configured to receive a print job, an allocation unit configured to allocate, to the print job received by the receiving unit, a printing process in which an image based on the received print job is printed on a printing medium by applying a printing agent thereto, and a drying process in which the printing agent applied to the printing medium is dried, and a change unit configured to change, based on a user's instruction, the drying process allocated by the allocation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention

FIG. 4 illustrates contents of management of received print jobs.

DESCRIPTION OF THE EMBODIMENTS

Various exemplary embodiments, features, and aspects of the invention will be described in detail below with reference to the drawings.

Figure 1:
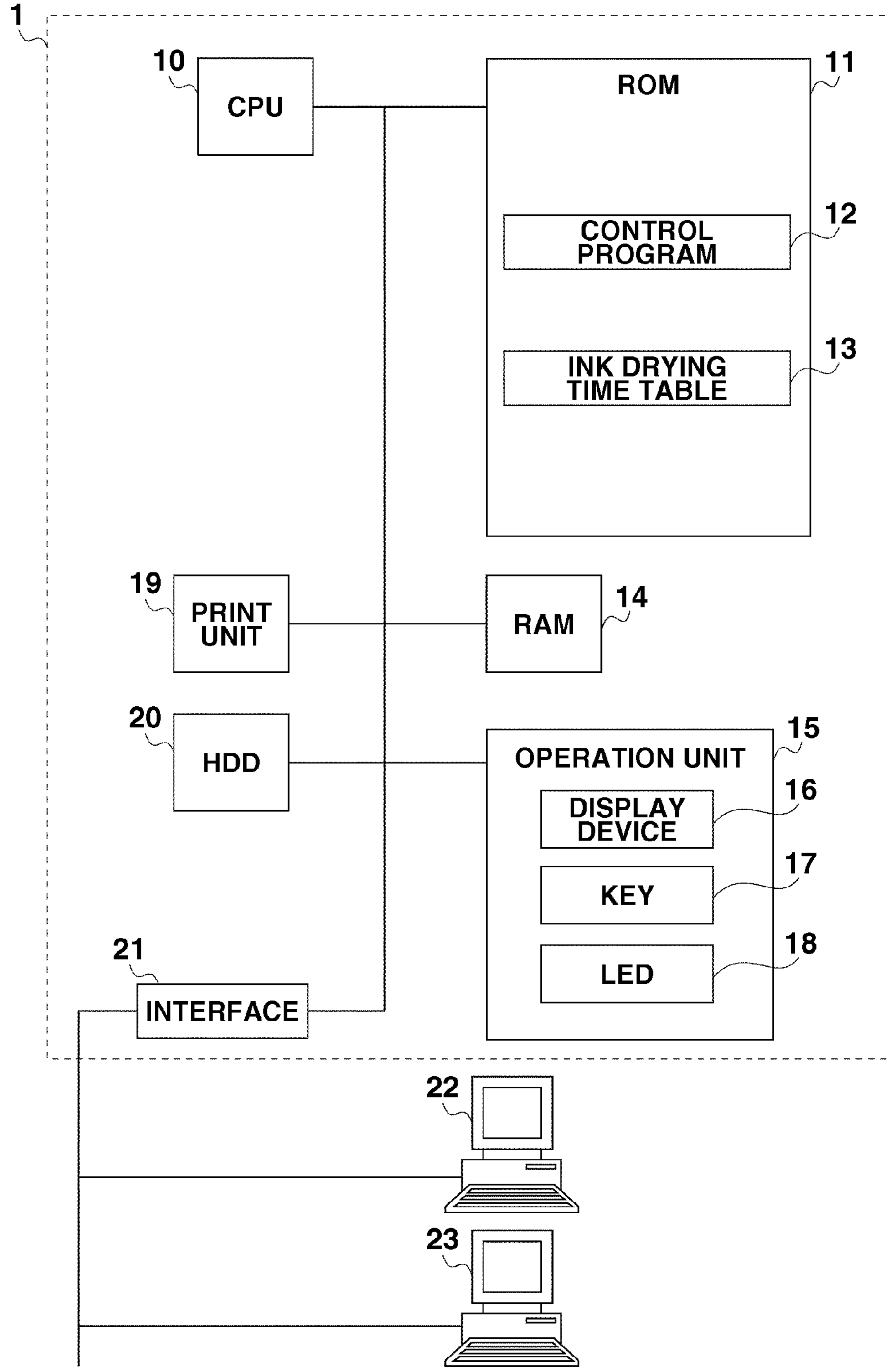
FIG. 1 illustrates a configuration of a print system according to an exemplary embodiment of the present invention.

FIG. 1 illustrates a configuration of a print system according to an exemplary embodiment of the present invention.

The present print system is configured by connecting a printer 1 and a plurality of client personal computers (PCs) 22 and 23, the number of which is not limited, via a network or the like. In this case, the printer 1 functions as a print control apparatus. However, a print control apparatus can be configured by parts of the printer 1 except a print unit. When a client PC controls a print job submitted to the printer 1, the client PC functions as a print control apparatus. Alternatively, a different server can be provided on the network such that a print job received from the client PC is controlled by the server. In this case, the server functions as a print control apparatus.

A central processing unit (CPU) 10 illustrated in FIG. 1 controls an operation of the entire printer 1. A read-only memory (ROM) 11 stores a control program 12 for causing the CPU 10 to control an operation of the printer 1, an ink drying time table 13 for determining an ink drying time that will be described below, and the like. The ROM 11 is configured by, e.g., a flash ROM, so that contents stored therein can be rewritten. The control program 12 includes a plurality of program codes for executing various processes including processes that will be described below.

In the ink drying time table 13, a drying time after ink is applied to a printing medium is set corresponding to each type of printing media (plain paper, coated paper, an overhead projector (OHP) film, and the like). The ink drying time table 13 includes a drying time corresponding to a predetermined number of dots formed of ink. The CPU 10 determines a drying time according to a type of a printing medium used in a printing process, and the number of dots formed of each type of ink used in the printing process. The drying time can be determined according to a size (or width) of the printing medium (i.e., the drying time can be set to vary with the size thereof). It is not necessary for determining the drying time to take into consideration all of such conditions (i.e., it is sufficient therefor to take into consideration only a part of the conditions). Alternatively, the drying time can be determined taking into consideration another condition additionally. Alternatively, the drying time can be set at a fixed value without being changed according to the above various conditions. A random access memory (RAM) 14 can be utilized as a work area to be used by the CPU 10 when executing the control program 12. The RAM 14 stores various set values.

An operation unit 15 receives a manual operation performed by a user, and displays information to be notified to the user. A display device 16 displays information representing a state of the printer 1, information corresponding to an operation performed by the user, and the like with, e.g., a liquid crystal display (LCD) panel, using characters and images. A key 17 receives, with, e.g., a hardware key, the operation performed by the user. If the operation unit 15 is implemented by a touch panel, the operation unit 15 is configured by the display device 16 and the key 17. A light emitting diode (LED) 18 indicates states of the printer 1 and the like by being turned on, off, blinked, and so on. Alternatively, the operation unit 15 can be provided with a plurality of LEDs 18 that respectively emit light rays differing in color from one another in order to notify information distinguished by the color of the light rays emitted therefrom.

A print unit 19 prints (or records) an image according to input image data on a printing medium (print paper (sheet)) using a printing agent. The following description is given employing roll paper (a continuous sheet) as an example of the printing medium. However, the printing medium is not limited thereto. The present invention can be applied to a case of printing an image on a cut sheet which is preliminarily cut into a predetermined size. A material of a printing medium is not limited to paper. Various printing media can be employed, as long as a printing process of applying a printing agent onto the printing medium (the printing process including that of applying an invisible (transparent) printing agent onto the printing medium) can be performed. The printing medium (i.e., the continuous sheet) is cut by a cutter provided in the printer 1 after an image of a designated region is printed thereon. Then, the sheet cut by the cutter is discharged from the printer 1.

The following description is given employing liquid ink as an example of the printing agent. However, various printing agents can be employed, as long as the printing agents need drying after applied to a printing medium. The colors of the printing agents can be limited to black, or printing agents respectively having a plurality of colors, such as cyan, magenta, and yellow, can be used to enable color printing.

When liquid ink is used, the print unit 19 is configured such that while a printing head which includes an ink tank filled with ink and a plurality of nozzles is caused to scan the printing medium, ink is applied onto the printing medium by discharging ink therefrom according to input image data. Then, an image is printed on a desired region by causing the printing head to repeat scanning while sequentially conveying the printing medium. The print unit 19 is not limited to a device that applies a printing agent directly to a printing medium. The print unit 19 can be configured to form an image by applying a recoding agent to an intermediate transfer member and transferring the recoding agent to a printing medium.

The printer 1 performs a drying process in order to prevent the printing medium to which the printing agent is applied from staining another printing medium already discharged to a paper discharge unit, and in order to, on the other hand, prevent the printing agent applied onto the printing medium already discharged to the paper discharge unit from staining the printing medium to be discharged hereafter. More specifically, the printer 1 does not discharge the printing medium onto which the printing agent is applied to the discharge unit immediately after applying the printing agent thereto. The printer 1 waits a predetermined time period based on the ink drying time table 13 for the printing agent to naturally dry.

A method for drying the printing agent according to the present invention is not limited to natural drying. A method for blowing air to a printing medium, and a method for heating a printing medium with a heater or the like can be employed as the method for drying the printing agent. According to either method, the printer 1 is caused to wait for discharging the printing medium for the predetermined time period. The printing agent applied to the printing medium is dried in order not only to prevent another printing medium from being stained, but also to stabilize the applied printing agent.

A hard disk drive (HDD) 20 can cause a hard disk incorporated therein to store a plurality of print jobs (including image data to be printed, print setting information, and so on). According to an instruction from the CPU 10, data can appropriately be written and read to and from the HDD 20. The HDD 20 can be configured to store the control program 12 and the ink drying time table 13.

An interface 21 is configured to connect the printer 1 to an external device. The interface 21 receives a print job from the external device and transmits information concerning the printer 1 to an external device. The information concerning the printer 1 includes printer state information representing a state during printing, a stand-by state, an error state, and the like. Although an example of setting the interface 21 as a network interface is described herein, the interface 21 is not limited the network interface. The interface 21 can be set to be a local interface connecting the printer 1 and an external device in a one-to-one correspondence manner. A print job of printing an image based on image data input via a scanner provided in the printer 1 can be employed, instead of a print job to be received from an external device via the interface 21. Alternatively, a print job of printing an image based on image data input via an external memory attached to the printer 1 can be employed.

The client PCs 22 and 23 are PCs including printer drivers for causing the printer 1 to perform printing. Each of the client PCs 22 and 23 can be implemented by a general-purpose PC including a CPU, a ROM, a RAM, a HDD, a display device, a keyboard, and the like. In other words, each of the client PCs 22 and 23 can be implemented by installing a program having the following functions in the general purpose PC. More specifically, the functions of the program includes a function of converting a format of print target data into that interpretable by the printer 1, a function of generating a command to give various instructions to the printer 1, and a function of displaying information based on data acquired from the printer 1. When the printer 1 is caused via a server provided on a network to perform printing, a part of the functions can be imparted to the server. The server can be implemented by installing, in the above general purpose PC, a program for performing the processing described in the foregoing description of the present exemplary embodiment.

Figure 2:
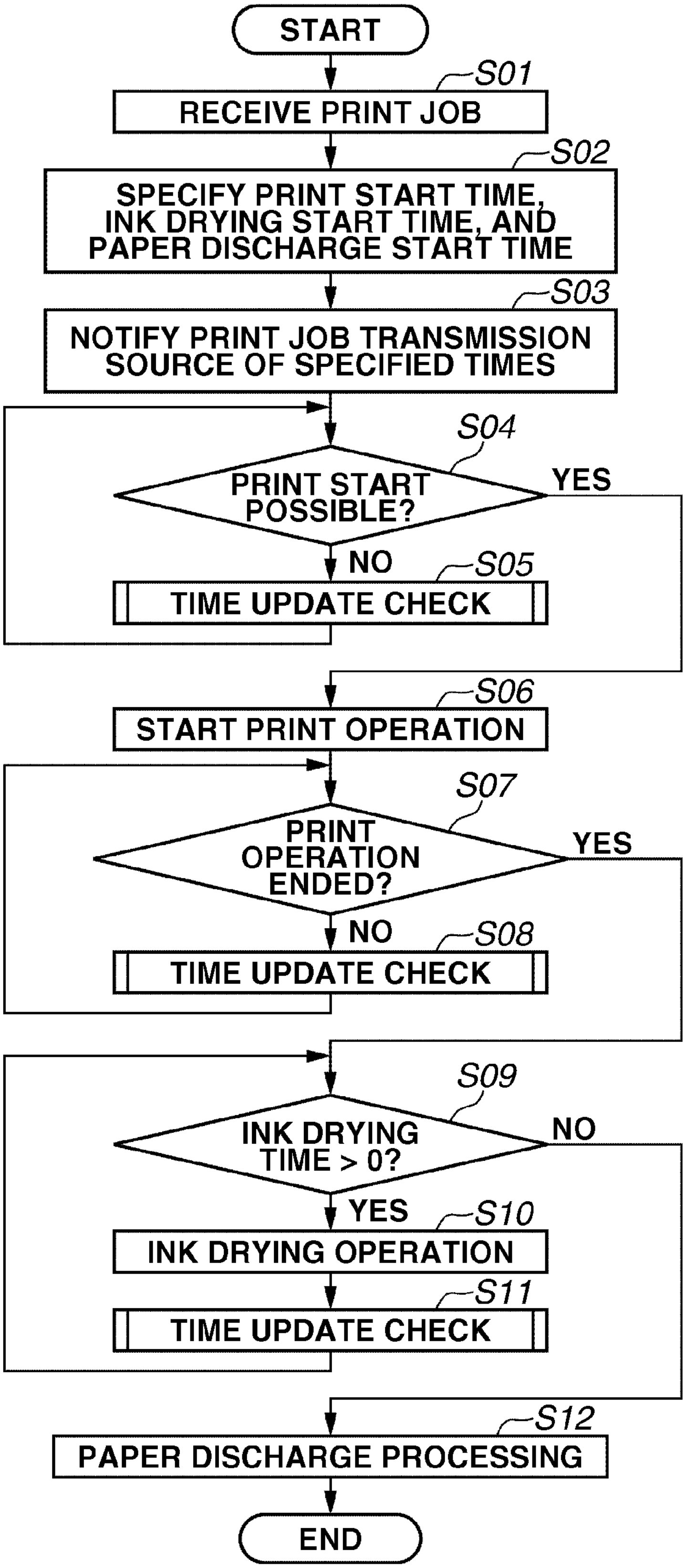
FIG. 2 is a flowchart illustrating a flow of processing performed by a printer.

FIG. 2 is a flowchart illustrating a flow of processing performed when the printer 1 newly receives a print job and performs printing according to the print job. The flowchart illustrates a process flow of expanding and executing the control program 12 stored in the ROM 11 in the RAM 14. An example of changing a drying time according to contents of a print job is described hereinafter. However, if the drying time is fixed, it is only necessary to set the fixed drying time regardless of the contents of the print job when the drying time is determined as will be described below.

In step S01, when a print job is received via the interface 21 (or from a scanner, an external memory, or the like (not shown)), the printer 1 causes the HDD 20 to store the print job. The print job includes image data to be printed, setting information for printing (a paper size, a type of paper, and the like), a user identification (ID) for specifying a user who issues the print job, and the like.

Then, in step S02, the printer 1 specifies a print start time, an ink drying start time, and a paper discharge start time which correspond to the print job received in step S01 based on the contents of print jobs waiting for printing which are already stored in the HDD 20 and those of the print job received in step S01.

First, the printer 1 obtains a time at which the printer 1 can start printing based on the print job received this time according to a situation of each print job waiting for printing which are already stored in the HDD 20. Then, the printer 1 founds a time period taken to print based on the contents of the print job received this time. Thus, the printer 1 obtains the ink drying start time. Then, the printer 1 founds a time period taken to perform an ink drying process by referring to the ink drying time table 13 according to the number of dots formed of ink of each type used in a printing process based on the received print job, and the type and the size of a recording medium designated corresponding to the print job. Thus, the printer 1 obtains an ink drying end time. A timing at which the ink drying end time has passed is set to be the paper discharge start time.

The CPU 10 specifies a moment corresponding to each of the times using a clock circuit (not shown) based on the times obtained as described above. The RAM 14 temporarily stores information representing the specified moment in order to transmit the information to the print job transmission source and in order to display each specified moment in the operation unit 15 (particularly, the display device 16). Apparently, the above specified moments are predicted times. The CPU 10 is assumed to appropriately correct each of the times according to a progress status of each process.

Thus, the CPU 10 allocates, to each received print job, a printing process in which a printing agent is applied to a printing medium, and a drying process in which the printing agent applied onto the printing process is dried. The CPU 10 manages the printing process and the drying process corresponding to each print job individually. The paper discharge start time can be replaced with the ink drying end time.

As illustrated in FIG. 4, all of print jobs input to the printer 1 are managed in the RAM 14 together with the specified times corresponding to each thereof. Job identifications (IDs) are respectively provided to the input print jobs in an order of inputting the print jobs. Each print job is distinguished by the job ID from other print jobs. A user ID transmitted together with each print job is associated therewith to identify a job transmission source. If there is information to be notified the transmission source, a notification destination corresponding thereto is specified based on the user ID. When no user ID can be specified, e.g., when image data transmitted from the scanner provided in the printer 1 or from the external memory set in the printer 1 is printed, information representing "local" is set, instead of the user ID. If the information representing "local" is set in a field corresponding to the user ID, information to be notified the job transmission source is not transmitted thereto via the interface 21. The information to be notified the job transmission source is stored in the RAM 14 and displayed in the operation unit 15 or the like later.

Each of the times specified in the above manner (particularly, the moments respectively corresponding to the print start time, the ink drying start time, and the paper discharge start time (or the ink drying end time) which correspond to the print job received this time) is notified the print job transmission source. More specifically, in step S03, information representing each of the moments specified in step S02 is notified the client PC serving as the print-job transmission source via the interface 21. If the printer 1 receives a print job via the server, information representing the moments which respectively correspond to the times is transmitted to the server. Information to be notified the print job transmission source is not limited to the information representing the moment. Various modifications can be made. For example, the information may be information simply indicating how many minutes will pass when each of the processes is started.

Then, in step S04, it is determined whether print processing based on the print job received in step S01 can be started. More specifically, it is determined based on the times specified in step S02 whether all of print jobs stored in the HDD 20 to be performed before the present printing process are completed, cancelled, or skipped, so that the present print job has a turn to start printing. If it is determined that the printer 1 can start printing corresponding to the present print job (YES in step S04), the processing proceeds to step S06, and the CPU 10 causes the print unit 19 to perform printing based on the present print job. On the other hand, if it is determined that the printer 1 cannot start the printing (NO in step S04), the processing proceeds to step S05, and update of the times specified in step S02 is checked.

Figure 3:
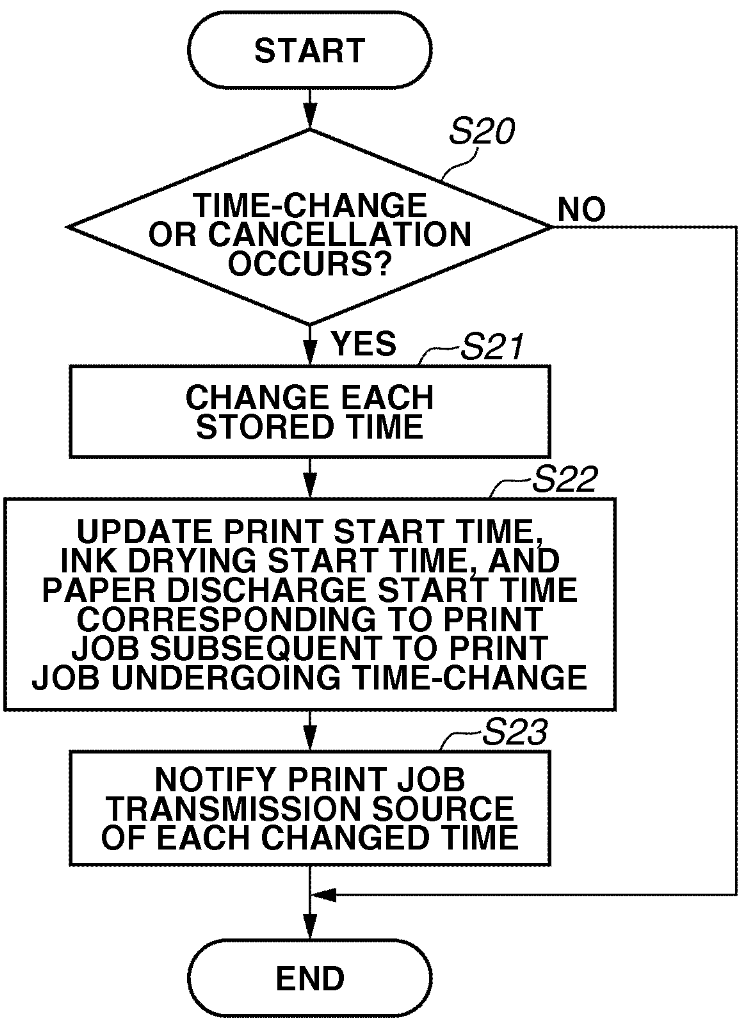
FIG. 3 is a flowchart illustrating a flow of change of an ink drying process.

Hereinafter, the processing (or an associated subroutine) to be executed in step S05 is described in detail by referring to FIG. 3. FIG. 3 is a flowchart illustrating a flow of a process of checking whether the specified times are updated based on the print job, and reflecting a checking result.

In step S20, it is determined whether change of the specified times corresponding to each print job stored in the HDD 20 occurs due to cancellation of the ink drying process, change of the drying time, cancellation of the print job, and the like. The cancellation of the ink drying process, the change of the drying time, and the cancellation of the print job, which are described below, can be performed in response to an operation input from the operation unit 15 or to an instruction input from the client PC. When the ink drying process is canceled, the ink drying time is changed to 0. If it is determined that the change of the specified times occurs (YES in step S20), the processing proceeds to step S21. If it is determined that the specified times are not changed (NO in step S20), the processing exits from the subroutine.

In step S21, the times stored in the RAM 14 in step S02 are updated so that the printer 1 reflects a determination result obtained in step S20. Then, in step S22, each of the times corresponding to print jobs subsequent to the print job, the times corresponding to which are changed in step S21, is updated. However, sometimes, a difference may be caused between each of the times updated in steps S21 and S22 and each of the times specified (or predicted) previously, due to a situation of the printer 1 (e.g., an error such as a jam, and a shortage of consumables such as ink and paper) and a progress status of each process. Accordingly, the CPU 10 appropriately corrects each of the times according to various situations.

Then, in step S23, information representing each of the times changes in steps S21 and S22 is transmitted to and notified the print job transmission sources. The "transmission sources" referred to herein designates all of senders of print jobs, the times corresponding to each of which are changed. When the changed times are notified the transmission sources, the processing exits the subroutine.

Turning back to FIG. 2, when the processing performed in step S05 is finished, the CPU 10 makes a determination in step S04 again. If the CPU 10 determines that the printer 1 can start the printing (YES in step S04), the processing proceeds to step S06 in which the CPU 10 causes the print unit 19 to start a printing operation based on the received print job. Then, in step S07, the CPU 10 determines whether the printing operation is terminated. "Termination of the printing operation" referred to herein designates the termination of the printing process between the printing process and the ink drying process included in the execution of the print job. Then, in step S08, the update of the times is checked in a manner similar to the process illustrated in FIG. 3. In step S07, if the CPU 10 determines that the printing operation is terminated (YES in step S07), the processing proceeds to step S09.

In step S09, it is determined by referring to the ink drying time stored in the RAM 14 whether a value larger than 0 is set as the value of the ink drying time corresponding to the print job which is determined in step S07 that the printing operation corresponding thereto is finished. If the ink drying process is canceled by a user, the value set as the ink drying time is 0.

If it is determined that a value larger than 0 is set as the ink drying time (YES in step S09), the processing proceeds to step S10 in which the ink drying process is performed. At that time, the printing medium is held without being discharged to the paper discharge unit (thus, without being cut) until the ink drying process is terminated (i.e., the set ink drying time passes). If the ink drying time is set using a moment at which ink drying is started and a moment at which the ink drying process is terminated, the ink drying process is terminated by determining whether the ink drying end time has been reached.

Then, in step S11, the update of the times is checked in a manner similar to the process illustrated in FIG. 3. In other words, if the ink drying time is 0 (NO in step S09), the processing proceeds to step S12 in which paper discharge processing is performed. In the paper discharge processing, the printing medium to which the printing agent is applied is cut. The cut printing medium is discharged to the paper discharge unit. Then, the CPU 10 proceeds to processing for a printing operation of the next print job stored in the HDD 20.

In the above process, the print job is managed by being divided into the printing process and the ink drying process, so that the ink drying process can be cancelled. Thus, the ink drying process in step S10 can be called off or shortened according to an instruction from a user. More specifically, the print job itself is not cancelled and the ink drying process of the print job to be executed can be canceled, while the printing process of to the print job is correctly performed. In addition, because the ink drying process, e.g., change of the drying time and cancellation of the ink drying process are individually managed, modification of the ink drying processes can be performed even before the ink drying process is started.

Figure 5A:
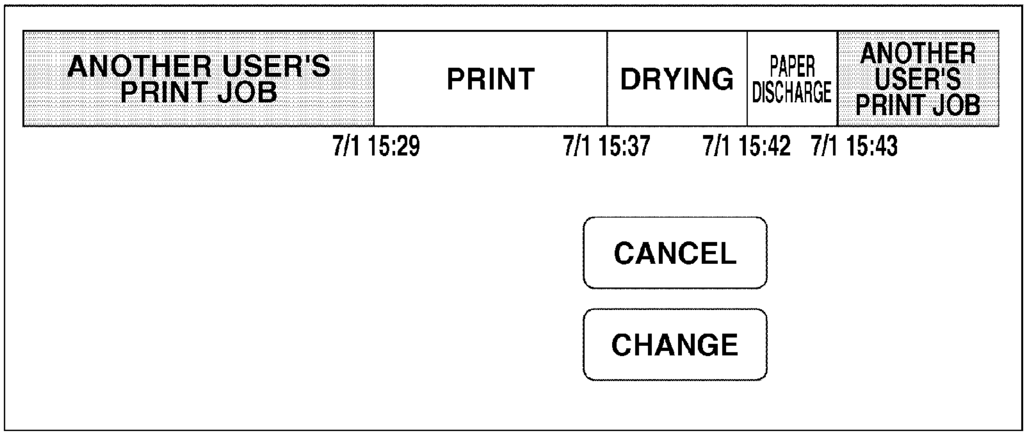
FIGS. 5A through 5C illustrate a screen for instructing operations of print jobs.
Figure 5B:
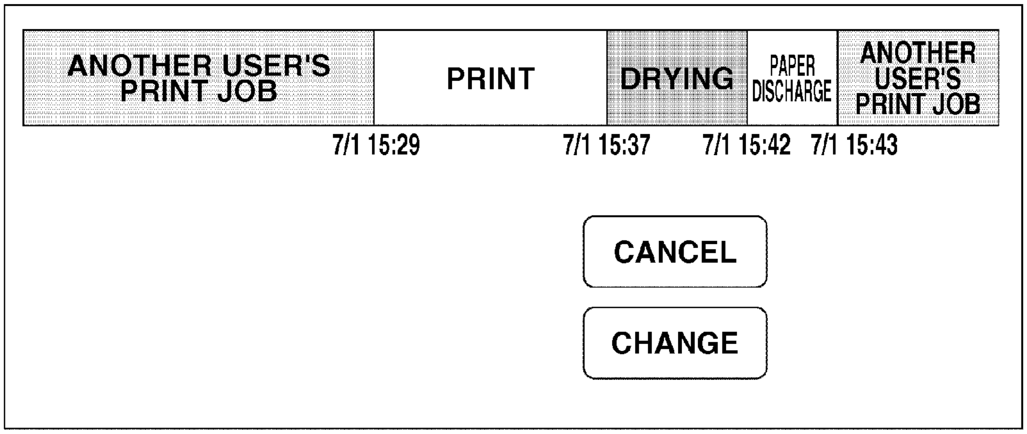
Figure 5C:
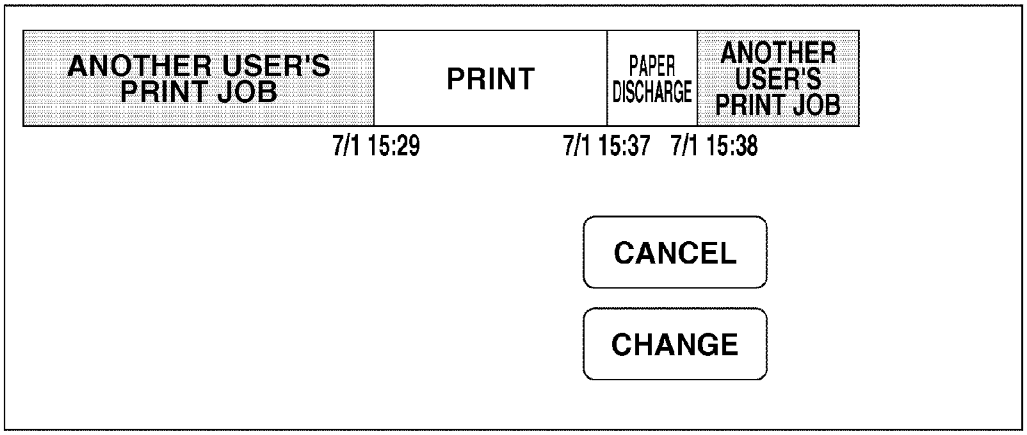

Next, a procedure for cancelling the ink drying process is described below. FIGS. 5A through 5C illustrate examples of screens indicating situations of a print job based on information acquired from the printer 1 in steps S03, S23, and the like.

In FIG. 5A, a print job transmitted from a user himself/herself operating the client PC is distinctly indicated so that the user can instruct the cancellation and the change of the processes of the print job. However, the present exemplary embodiment may allow the user to perform the cancellation and the change of the processes of the print jobs transmitted from other users similar to the own print jobs. The screen indicates a print start time, an ink drying start time, a paper discharge start time, and a paper discharge time based on information representing moments corresponding to the times acquired from the printer 1. These times can be specified by acquiring the information representing moments corresponding to the times from the printer 1. Alternatively, the moments corresponding to the times can be specified by the client PC by acquiring, e.g., information indicating that a printing operation will be started X-hours later hereafter, and information indicating that Y-hours are required to perform each of the printing process, the ink drying process, and the paper discharge process. Although FIGS. 5A through 5C illustrate simplified displays, job IDs can be indicated simultaneously with the display in order to facilitate the identification of the present print job.

In the display screen illustrated in FIG. 5A, the user of the client PC can instruct the cancellation or the change of the ink drying process by selecting (e.g., clicking on) a region "DRYING" using an input device (e.g., a mouse). When the "drying" process is selected, the display screen illustrated in FIG. 5A is changed into that illustrated in FIG. 5B, which is configured to be able to recognize that the drying process is selected. When a "cancel" icon or a "change" icon is selected in this state, the cancellation of the ink drying process or the change of the ink drying time can be performed.

Figure 6A:
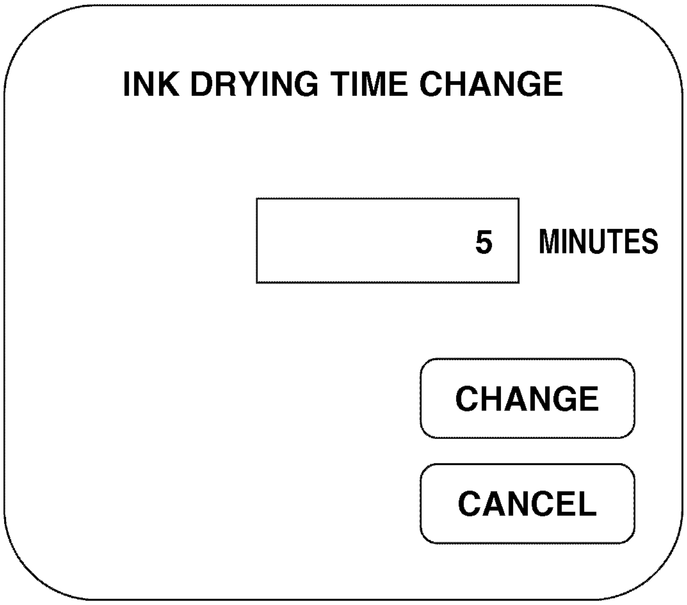
FIGS. 6A and 6B illustrate a screen for instructing operations of an ink drying process.

If the "change" icon is selected, a screen illustrated in FIG. 6A is displayed on the display device of the client PC. Thus, the user can arbitrarily change the ink drying time using a keyboard or the like.

Figure 6B:
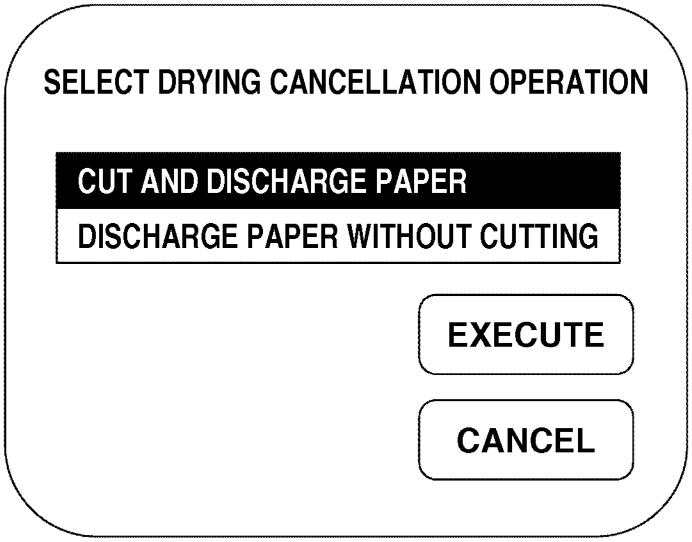

On the other hand, if the "cancel" icon is selected, a screen illustrated in FIG. 6B is displayed. The user can select an operation to be performed when the ink drying process is cancelled. If the user selects an operation "CUT AND DISCHARGE PAPER", the user can cancel the ink drying process and cause the printer 1 to cut the printing medium with a cutter to discharge the cut printing medium. If the user selects an operation "DISCHARGE PAPER WITHOUT CUTTING", the ink drying process is canceled. However, the printing medium is not automatically cut by the cutter, and the user manually operates the printer 1 to cut the printing medium. In this case, the printing medium is made to hang down from a paper discharge port of the printer 1 until the user performs the cutting operation on the printer 1. Consequently, when the user cancels the ink drying process, the user can flexibly select operations. For example, because the user knows that there is no other printing medium in the paper discharge unit, the user can cause the printer 1 to automatically cut the printing medium. Alternatively, because the user does not know whether there is another printing medium, the cutting of the printing medium is manually performed.

However, the printer 1 can be set to discharge paper according to a predetermined paper discharge method without displaying the screen as illustrated in FIG. 6B. When the drying time is changed to "0" in the screen illustrated in FIG. 6A, the ink drying process is canceled. When the drying time is changed to "0", a paper discharge method can be selected by displaying the screen configured as illustrated in FIG. 6B. Alternatively, a printing medium can be discharged according to a predetermined paper discharge method.

When the ink drying process is canceled, the screen illustrated in FIG. 5B is changed to the screen illustrated in FIG. 5C, which reflects the cancellation of the ink drying method.

In the above screen transition, when the "cancel" icon is selected, the client PC transmits via the interface 21 to the printer 1 information representing the job ID, the user ID, an instruction to cancel the ink drying process, and a paper discharge method (e.g., printing medium automatic cutting is on or off). In step S20, the CPU 10 receives the information. Then, in steps S21 and S22, the CPU 10 performs the ink drying process corresponding to the print job concerned. The screen illustrated in FIG. 5C is displayed based on the information notified from the printer 1 in step S23.

On the other hand, when the "change" icon is selected, and the drying time is designated in the screen illustrated in FIG. 6A, the client PC transmits via the interface 21 to the printer 1 information representing the job ID, the user ID, and a new ink drying time. The CPU 10 receiving the information in step S20 performs the ink drying process corresponding to the print job concerned in steps S21 and S22. Then, the client PC changes the screen illustrated in FIG. 5B to a screen showing the new ink drying time.

When the "print" process is selected and the "cancel" icon is designated in the screen illustrated in FIG. 5A, the execution of the job itself is canceled. This is because a situation in which only the printing process is canceled and the ink drying process is performed is not caused. When the "paper discharge" process is selected and the "cancel" icon is designated, the automatic cutting of the printing medium is canceled. When each of the "print" process and the "paper discharge" process is selected, the designation of the "change" icon is not received.

In the foregoing description, an example of the print job for printing data of 1 page has been described. However, the present invention can be applied to the print job for printing data of a plurality of pages. In this case, an ink drying process is performed after data of each page is printed. However, the printer 1 may be configured to be able to instruct cancellation of the ink drying process or change of the ink drying time every time the ink drying process is executed after the printing of each page. Alternatively, once the cancellation of the ink drying process and the change of the drying time is instructed, the instruction can be applied to all pages in the print job.

Alternatively, the cancellation of the ink drying process or the change of the drying time can be instructed from the operation unit 15. In other words, the instruction of the cancellation of the ink drying process or the change of the drying time which is issued from the operation unit 15 instead the instruction issued from the client PC can be input to (i.e., received by) the CPU 10, and can be executed in the above described manner.

In this case, the CPU 10 causes the display device 16 to display a screen for selecting the cancellation of the print job itself which is currently being executed or the cancellation of the ink drying process of the print job by instructing the cancellation with the key 17. When the cancellation of the ink drying process is selected in the screen, the CPU 10 causes the display device 16 to display the screen as illustrated in FIG. 6B. When the "execute" icon is selected, the CPU 10 performs cancellation processing, as described above. When the ink drying time is changed, an instruction to change the ink drying time can be executed similarly to the instruction issued from the client CPU.

In addition, the CPU 10 can cause the display device 16 to display a list of print jobs (e.g., a list of the print jobs illustrated in FIG. 4) that are being printed or waiting for printing, so that a user can cancel a desired print job by designating the one from among a plurality of the print jobs. In other words, the operation unit 15 can be configured to instruct the cancellation of the designated print job, the cancellation of the ink drying process of the designated print job, and the change of the ink drying time.

A cancellation instruction can be set not to distinguish between the cancellation of a print job and that of an ink drying process of the print job. Which of the print job and the ink drying process will be cancelled can be determined according to a situation in which the cancellation instruction is input to the printer 1.

More specifically, if the printer 1 executes a printing process when the cancellation instruction is input thereto, the input cancellation instruction is determined to cancel the print job. Then, the printer 1 cancels the print job. On the other hand, if the printer 1 executes an ink drying process when the cancellation instruction is input thereto, the input cancellation instruction is determined to cancel the ink drying process. Then, the printer 1 cancels the ink drying process after the printing process. In this case, an operation error can be reduced by indicating which of the processes is being performed in the display device 16 or the like.

Further, an operation error can be reduced by indicating which of the processes will be canceled when the cancellation instruction is input, and then cancelling the indicated process when the user issues an instruction representing "OK" in response to the indication of the process to be canceled.

The printer 1 can be configured such that, in a case where a printing process once started is performed to the end, a print job is canceled if the printing process is not started yet when the cancellation instruction is issued, whereas the printing process is performed to the end and an ink drying process is canceled if the printing process is already started when the cancellation instruction is issued.

Alternatively, the printer 1 can be configured to display, when the cancellation instruction is input, a screen for prompting a user to designate a target to be cancelled, i.e., one of a printing process and an ink drying process, or both of the processes (i.e., a print job).

According to the above described exemplary embodiment of the present invention, an ink drying process after execution of a printing process of a received print job can be canceled or an ink drying time can be changed according to a user's manual instruction using the client PC or the operation unit 15. Consequently, the user can cancel the ink drying process in consideration of an execution status of the print job, a state of the printer 1, and the user's circumstances. Thus, efficiency of the entire system can be improved.

The present invention can be implemented by performing the following processes, i.e., processes of providing a system or an apparatus via a network or various storage media with software (a program) implementing the functions of the above described exemplary embodiments and of reading and executing the program with a computer (a CPU, a microprocessing unit (MPU) or the like) of the system or the apparatus. The program can be executed by either a single computer or a plurality of computers in cooperation with one another. It is not always necessary to achieve the above processes with software. Part or all of the processes can be implemented by hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-224835 filed Sep. 29, 2009, which is hereby incorporated by reference herein in its entirety.

What is claimed is:

1. A print control apparatus comprising:

a receiving unit configured to receive a print job;

a management unit configured to manage a printing process and a drying process corresponding to the print job received by the receiving unit individually, wherein the printing process is a process in which an image based on the received print job is printed on a printing medium by applying a printing agent thereto and the drying process is a process in which the printing agent applied to the printing medium is dried;

a notification unit configured to notify information on a drying time of the drying process of the print job which is individually managed by the management unit; and a change unit configured to change, based on a user's instruction, each of the printing process and the drying process of the print job which is individually managed by the management unit.

2. The print control apparatus according to claim 1, wherein the change unit cancels the drying process which has been managed by the management unit.

3. The print control apparatus according to claim 1, wherein the change unit changes the drying time of the drying process which has been managed by the management unit.

4. The print control apparatus according to claim 1, wherein the management unit further manages a printing medium discharge process, the printing process, and the drying process corresponding to the received print job individually, and wherein the change unit changes the managed drying process based on the user's instruction from an input unit and causes discharge of the printing medium.

5. The print control apparatus according to claim 1, wherein the notification unit is configured to notify information on a printing time of the printing process and the information on the drying time of the drying process each included in the print job which the printing process and the drying process are individually managed by the management unit.

6. The print control apparatus according to claim 5, wherein the drying time includes a moment at which the managed drying process is started and a moment at which the managed drying process is ended.

7. The print control apparatus according to claim 1, further comprising an operation unit configured to receive an operation input by a user, wherein the change unit changes, based on an operation unit instruction received via the operation unit, the drying process which has been managed by the management unit.

8. The print control apparatus according to claim 1, further comprising a connection unit configured to connect to an external device, wherein the change unit changes, based on an external device instruction received from a user via the external device connected thereto via the connection unit, the drying process which has been managed by the management unit.

9. A method for a print control apparatus, the method comprising:

receiving a print job;

managing a printing process and a drying process corresponding to the received print job individually, wherein the printing process is a process in which an image based on the received print job is printed on a printing medium by applying a printing agent thereto and the drying process is a process in which the printing agent applied to the printing medium is dried;

notifying information on a drying time of the drying process of the print job which is individually managed; and changing, based on a user's instruction, each of the printing process and the drying process of the print job which is individually managed.

10. A non-transitory computer-readable storage medium storing a computer-executable program causing a print control apparatus to perform the method according to claim 9.

11. The print control apparatus according to claim 1, further comprising a cancel unit configured to cancel the print job received by the receiving unit, wherein, in response to the user's instruction being a cancel instruction and the printing process being performed when the cancel instruction is input, the print job is cancelled by the cancel unit, and wherein in response to the user's instruction being a cancel instruction and the drying process being performed when the cancel instruction is input, the drying process is cancelled by the change unit.

12. The print control apparatus according to claim 1, further comprising a cancel unit configured to cancel the print job received by the receiving unit, wherein, in response to the user's instruction being to cancel the print job, the print job is cancelled by the cancel unit, and wherein, in response to the user's instruction being to cancel the drying process, the drying process is cancelled by the change unit.

13. The print control apparatus according to claim 1, wherein, prior to the management unit managing the drying process of the print job received by the receiving unit, the drying process is determined based on contents of the received print job before the received print job is pending print job waiting for printing in the print control apparatus.

14. The print control apparatus according to claim 1, wherein, prior to the management unit managing the drying process to the print job received by the receiving unit, the drying process is determined based on contents of a print job, other than the received print job, waiting for printing in the print control apparatus.

15. The print control apparatus according to claim 1, wherein the management unit further is configured to manage, to each print job received by the receiving unit before the received print job is a pending print job waiting for printing in the print control apparatus, a printing process and a drying process based on contents of each received print job and a print job, other than the received print job, waiting for printing in the print control apparatus.

16. The print control apparatus according to claim 1, wherein, in managing the drying process of the received print job, a drying time of the drying process and cancellation of the drying process are configured to be individually managed.

17. The print control apparatus according to claim 1, wherein, in response to receiving a discharge instruction to discharge printing medium without cutting, the change unit cancels the drying process.

18. The print control apparatus according to claim 1, wherein, in response to receiving, after the printing process has begun and before the printing process has ended, a cancellation instruction to cancel the print job, the printing process is performed to end and the change unit cancels the drying process.

19. The print control apparatus according to claim 1, wherein the change unit is configured to perform change regardless of whether a print job is a pending print job or a print job in execution.

20. The print control apparatus according to claim 1, further comprising a display control unit configured to cause a display unit to display the printing process and the drying process, each managed by the management unit, so as to be distinguished from each other on the display unit.

21. The print control apparatus according to claim 20, wherein the notification unit is configured to notify information by displaying the information on the display unit, and wherein the change unit changes each of the printing process and the drying process based on a user's change instructing unit instruction, via a change instructing unit, displayed on the display unit which is caused by the display control unit to display the user's change instructing unit instruction.

22. The print control apparatus according to claim 1, further comprising an updating unit configured to update, in a case where the change unit has changed the drying process of the print job, information on a drying time of a drying process of each print job following the print job in which the drying process has been changed, wherein the notification unit is configured to notify the information updated by the updating unit.

23. The print control apparatus according to claim 1, wherein the notification unit notifies the information on the drying time of the drying process of the printing job to a print job transmission source.

24. The print control apparatus according to claim 1, wherein the management unit is configured to manage the printing process and the drying process individually for each print job or each page of the print job, and wherein the change unit is configured to be able to change the drying process for each print job or each page of the print job.

* * * * *